United States Patent

Ogunwumi et al.

(10) Patent No.: US 7,071,135 B2
(45) Date of Patent: Jul. 4, 2006

(54) CERAMIC BODY BASED ON ALUMINUM TITANATE AND INCLUDING A GLASS PHASE

(75) Inventors: Steven B. Ogunwumi, Painted Post, NY (US); Patrick D. Tepesch, Corning, NY (US)

(73) Assignee: Corning Incorporated, Corning, NY (US)

( * ) Notice: Subject to any disclaimer, the term of this patent is extended or adjusted under 35 U.S.C. 154(b) by 100 days.

(21) Appl. No.: 10/954,686

(22) Filed: Sep. 29, 2004

(65) Prior Publication Data

US 2006/0064957 A1 Mar. 30, 2006

(51) Int. Cl.
*C04B 35/478* (2006.01)
*B01D 39/20* (2006.01)

(52) U.S. Cl. .................. 501/134; 501/32; 422/177; 55/523; 264/630

(58) Field of Classification Search ............... 501/32, 501/134; 422/177; 55/523
See application file for complete search history.

(56) References Cited

U.S. PATENT DOCUMENTS

| | | | | |
|---|---|---|---|---|
| 4,483,944 A | * | 11/1984 | Day et al. | 502/439 |
| 4,767,731 A | | 8/1988 | Asami et al. | |
| 5,153,153 A | * | 10/1992 | Freudenberg et al. | 501/127 |
| 5,290,739 A | * | 3/1994 | Hickman | 501/128 |
| 5,422,324 A | * | 6/1995 | Noguchi et al. | 501/128 |
| 2003/0181310 A1 | * | 9/2003 | Yamamoto et al. | 501/119 |
| 2004/0092381 A1 | * | 5/2004 | Beall et al. | 501/134 |

* cited by examiner

*Primary Examiner*—Karl Group
(74) *Attorney, Agent, or Firm*—Anca C. Gheorghiu

(57) ABSTRACT

A ceramic body comprising a crystal phase of aluminum titanate in an amount of 50 to 95% by weight, and a glass phase in an amount of 5 to 50% by weight. The inventive ceramic body may include a second crystal phase, for example mullite in an amount of up to 40% by weight. The glass is an aluminosilicate including, in weight percent on an oxide basis, of 50–90 $SiO_2$, 1–25 $Al_2O_3$, 0.5–10 $TiO_2$, 0.5–20 $R_2O$, where R is selected from the group consisting of Li, Na, K, Ru, Cs, Fr, and 0.5–20 R'O, where R' is selected from the group consisting of Be, Mg, Ca, Ba, Ra, and wherein the ceramic body includes not more than 2% by weight $Fe_2O_3$.

12 Claims, 5 Drawing Sheets

Example A: 70wt.% AT-30 wt.% M.
Example B: 69wt.% AT-30 wt.% M-1wt.% $Fe_2TiO_5$.
Example C: 67wt.% AT-30 wt.% M-3wt.% $Fe_2TiO_5$.
Example D: 61wt.% AT-30 wt.% M-9wt.% $Fe_2TiO_5$.
Example E: 90wt.%AT-M(70wt.% AT-30 wt.% M)-10wt.% Glass.
Example F: 90wt.% AT-M(61wt.% AT-30 wt.% M-9wt.% $Fe_2TiO_5$-10wt.% Glass.

Example A: 70wt.% AT-30 wt.% M.
Example B: 69wt.% AT-30 wt.% M-1wt.% $Fe_2TiO_5$.
Example C: 67wt.% AT-30 wt.% M-3wt.% $Fe_2TiO_5$.
Example D: 61wt.% AT-30 wt.% M-9wt.% $Fe_2TiO_5$.
Example E: 90wt.%AT-M(70wt.% AT-30 wt.% M)-10wt.% Glass.
Example F: 90wt.% AT-M(61wt.% AT-30 wt.% M-9wt.% $Fe_2TiO_5$-10wt.% Glass.

Sample 1: 99wt.% AT-1wt.% Glass.
Sample 2: 95wt.% AT-1wt.% Glass.
Sample 3: 90wt.% AT-1wt.% Glass.
Sample 4: 99wt.% AT-M (70wt.% AT-30 wt.% M)-1wt.% Glass.
Sample 5: 95wt.% AT-M (70wt.% AT-30 wt.% M)-1wt.% Glass.
Sample 6: 90wt.% AT-M (70wt.% AT-30 wt.% M)-1wt.% Glass.
Sample 7: 67wt.% AT-30 wt.% M-3wt.% $Fe_2TiO_5$.

Sample 1: 99wt.% AT-1wt.% Glass.
Sample 2: 95wt.% AT-1wt.% Glass.
Sample 3: 90wt.% AT-1wt.% Glass.
Sample 4: 99wt.% AT-M (70wt.% AT-30 wt.% M)-1wt.% Glass.
Sample 5: 95wt.% AT-M (70wt.% AT-30 wt.% M)-1wt.% Glass.
Sample 6: 90wt.% AT-M (70wt.% AT-30 wt.% M)-1wt.% Glass.
Sample 7: 67wt.% AT-30 wt.% M-3wt.% $Fe_2TiO_5$.

CERAMIC BODY BASED ON ALUMINUM TITANATE AND INCLUDING A GLASS PHASE

BACKGROUND OF THE INVENTION

The present invention relates to a ceramic body based on aluminum titanate that has improved properties for use in high temperature applications and a method for making the same. In particular, the present invention relates to a ceramic body having a crystal phase of aluminum titanate or aluminum titanate-mullite and a glass phase of alkali or alkaline earth aluminosilicate, and exhibiting a high resistance to thermal decomposition and low thermal cycling growth or change in dimensional integrity.

Aluminum titanates have been proposed for use in high temperature applications, as diesel particulate filters and substrate for catalytic converters, an example of which is known commonly in the art as a honeycomb substrate. Additionally, aluminum titanates are desirable in applications where the thermal shock resistance and the ultimate use temperature are high. Cellular substrates used under conditions of high thermal gradients are examples of this application. Typically, structures such as these are subjected to harsh environments which require high thermal shock resistance, low thermal expansion, and good mechanical properties. Furthermore, the ceramic material must maintain these desirable properties after prolonged exposure at high temperatures, without significant change in dimensional integrity with repeated cyclings in the desired temperature range.

It is known in the art that aluminum titanate undergoes decomposition into alumina and titania with prolonged exposure to high temperatures, and that the inclusion of rare earth oxides and iron oxides provides stability under continuous high temperature use (U.S. Pat. Nos. 4,483,944 and 4,855,265). However, the biggest challenge with honeycomb substrates comprising aluminum titanates is thermal cycling growth or dimensional change with repeated cycling at high temperatures. U.S. Pat. No. 4,767,731 teaches that in a mullite-aluminum titanate ceramic improved durability against thermal cycling is obtained by maintaining the glass phase of less than 5%.

It has been found with the present invention that the addition of surprising large amounts of glass to an aluminum titanate-based ceramic has beneficial effects on thermal cycling growth while the addition of $Fe_2O_3$ to form $Fe_2TiO_5$ phase as the stabilizer in aluminum titanate, unless minimal, exacerbates this condition. The combination of aluminum titanate and alkali or alkaline earth aluminosilicate glass may then be subsequently extruded and sintered to form a honeycomb structure. The resultant structure produces a product with reduced thermal cycling growth and good thermal durability.

SUMMARY OF INVENTION

The present invention relates to a ceramic body comprising a crystal phase of aluminum titanate in an amount of 50 to 95% by weight, and a glass phase in an amount of 5 to 50% by weight. In addition to the aluminum titanate phase, optionally, the inventive ceramic body may include a second crystal phase, for example mullite in an amount of up to 40% by weight.

The glass is an aluminosilicate consisting essentially, in weight percent on an oxide basis, of 50–90 $SiO_2$, 1–25 $Al_2O_3$, 0.5–10 $TiO_2$, 0.5–20 $R_2O$, where R is selected from the group consisting of Li, Na, K, Ru, Cs, Fr, and 0.5–20 R'O, where R' is selected from the group consisting of Be, Mg, Ca, Ba, Ra, and wherein the ceramic body includes not more than 2% by weight $Fe_2O_3$.

The addition of glass enhances the resistance of the aluminum titanate phase to thermal decomposition at high temperatures, and reduces dimensional growth during thermal cycling. Specifically, the inventive body has a high resistance to thermal decomposition as characterized by a titania ($TiO_2$) (d-spacing of 3.25) to aluminum titanate ($Al_2O_3$—$TiO_2$) (average of d-spacings 4.70, 3.35, 2.65, and 1.90) peak ratio of less than 100% after heating to 1100° C. for 100 hours. The low thermal cycling growth is characterized by a linear dimensional growth of less than 0.5% after the ceramic body undergoes at least 200 cycles of heating between 200° C. to 1100° C. in a time of 10 minutes, and cooling between 1100° C. to 200° C. in a time of 10 minutes.

Other advantages may include improving the body's strength by controlling grain-growth of the aluminum titanate phase, reducing the coefficient of thermal expansion (CTE), controlling the degree of microcracking, and lowering the sintering temperature.

In a method of forming the inventive bodies first a batch of raw materials including sources of silica, alumina, titania, alkali metals, alkaline earth metals, and optionally a pore former is formulated. Then the batch of inorganic raw materials are mixed with organic processing aids including lubricants, binders, plasticizers, and the like, and water as solvent to form a homogeneous and plasticized mixture. The plasticized mixture is shaped into a green body, usually by extrusion, such as forcing the batch through an appropriate die, typically a honeycomb die. The green bodies are optionally dried, and then heated to a temperature and for a period of time to develop the ceramic body. Typically, firing temperatures include 1350–1650° C., with hold times of 6–10 hours.

Inventive bodies are suited for high temperature applications where high thermal shock resistance, low thermal cycling growth and compositional integrity are required. Examples of such applications include catalytic converter substrates, and diesel particulate filters.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE INVENTION

Figure 1:
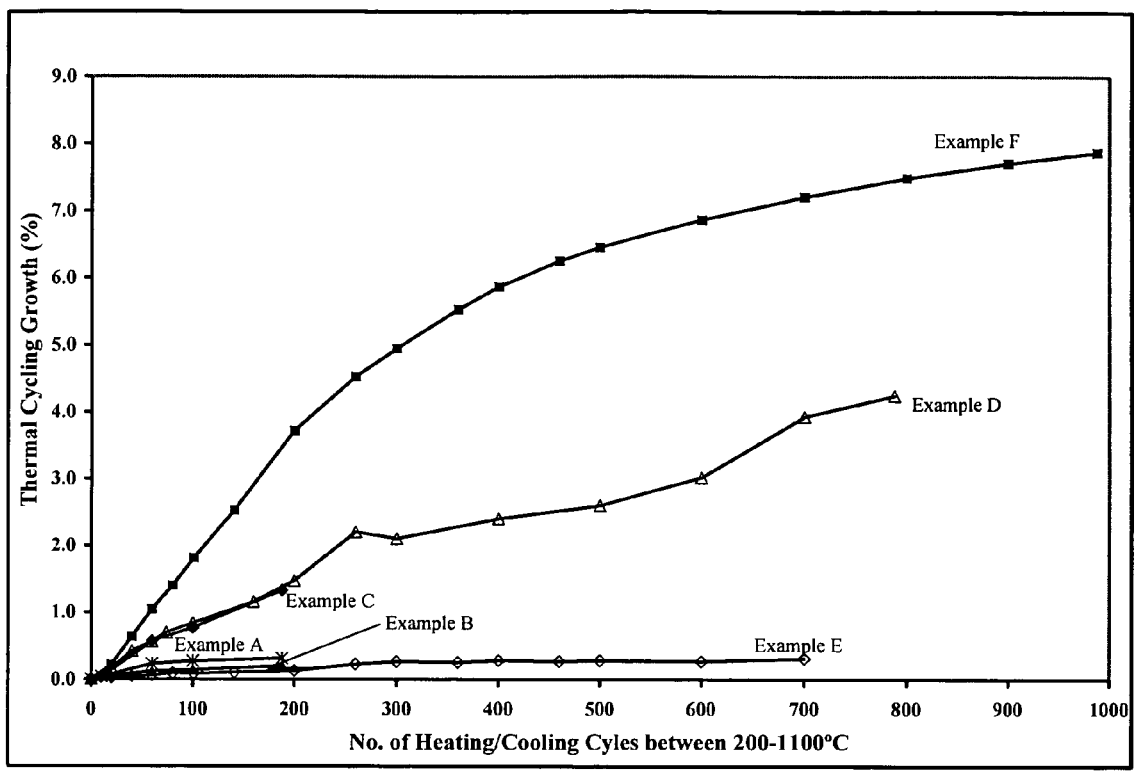
FIG. 1 compares the thermal cycling growth for aluminum titanate-mullite ceramic bodies, some containing $Fe_2O_3$ and/or glass additions, as a function of cycles of heating between 200–1100° C. in a time of 10 minutes, and cooling between 1100–200° C. in a similar time period.

FIG. 1 shows the effect of $Fe_2O_3$ and glass additions on the thermal cycling growth of aluminum titanate-mullite ceramic bodies. The growth is plotted as a function of cycles of heating between 200° C.–1100° C. in a time of 10 minutes, and cooling between 1100–200° C. in a similar time period. All examples include 70 wt. % aluminum titanate (AT) and 30 wt. % mullite (M). For examples B, C, and D, 1%, 3% and 9% by weight of the aluminum titanate phase is replaced with $Fe_2TiO_5$. Example E additionally includes 10 wt. % glass phase. For example F, 9 wt. % of the aluminum titanate phase is replaced with $Fe_2TiO_5$. Example F also includes 10 wt. % glass phase. The glass phase consists essentially, on an oxide basis, of 74.87 wt. % $SiO_2$, 18.97 wt. % $Al_2O_3$, 2.00 wt. % $TiO_2$, 1.16 wt. % $Na_{2O}$, 1.99 wt. %, CaO, and 1.00 wt. % $K_2O$.

Thermal cycling growth increases with higher levels of $Fe_2O_3$ which is added to form $Fe_2TiO_5$. Also, glass in the presence of $Fe_2O_3$ further enhances growth. Therefore, the amount of $Fe_2O_3$ needs to be limited or even eliminated in aluminum titanate-based ceramics, and especially in the presence of a glass phase to minimize thermal cycling growth. The lowest thermal cycling growth is observed with example D, a ceramic body composed of 70 wt. % aluminum titanate and 30 wt. % mullite, having a crystal phase of 90 wt. %, and 10 wt. % glass. This example is also observed to require a lower firing or sintering temperature.

Further, the coefficient of thermal expansion (CTE) of example D following thermal cycling remains comparable to CTE prior to undergoing thermal cycling, which is indicative of little thermal decomposition. Therefore, adding a glass phase to an aluminum-titanate body which included low levels of $Fe_2O_3$ limits thermal cycling growth and provides resistance to thermal decomposition.

Accordingly, the invention provides a ceramic body composed predominantly of a crystal phase aluminum titanate ($Al_2O_3$—$TiO_2$) in an amount of 50 to 95% by weight, and further includes an added glass phase in an amount of 5 to 50% by weight. The ceramic body may include up to 2% by weight $Fe_2O_3$. Higher amounts however have negative effects on thermal cycling growth and thermal decomposition. The ceramic body may also include other secondary crystalline phase, such as up to 40% by weight mullite ($3Al_2O_3$—$2SiO_2$).

The glass being added is an aluminosilicate with a composition consisting essentially, in weight percent on an oxide basis, of 50–90 $SiO_2$, 1–25 $Al_2O_3$, 0.5–10 $TiO_2$, 0.5–20 $R_2O$, where R is selected from the group consisting of Li, Na, K, Ru, Cs, Fr, and 0.5–20 R'O, where R' is selected from the group consisting of Be, Mg, Ca, Ba, and Ra. A useful glass consists essentially, in weight percent on an oxide basis, of 70–80 $SiO_2$, 15–22$Al_2O_3$, 1–3 $TiO_2$, 0.5–5 $Na_2O$, 0.5–5 CaO, 0.5–5 $K_2O$. Another suitable glass consists essentially, in weight percent on an oxide basis, of 50–70 $SiO_2$, 10–20 $Al_2O_3$, 5–20 $Na_2O$, 5–20 $K_2O$.

In addition to low thermal cycling growth and excellent thermal decomposition at high temperatures, the inventive bodies are highly refractory with a low coefficient of thermal expansion (CTE) (room temperature (RT) to 1000° C.) of less than $20 \times 10^{-7}$ $°C.^{-1}$ (as measured by dilatometry). Accordingly, the present materials are especially suitable for high temperature applications such as automotive emissions control systems.

Further, an examination of FIG. 2 which is a SEM photomicrograph representative of the inventive bodies of the present invention (i.e., sample 8 further described below) and includes 95 wt. % aluminum titanate and 5 wt. % glass consisting essentially, on an oxide basis of 62.01 wt. % $SiO_2$, 17.54 wt. % $Al_2O_3$, 10.94 wt. % $Na_2O$, and 9.51 wt. % $K_2O$ (Glass Y) reveals a well connected porosity with a uniform pore distribution. This combination of porosity and pore size distribution is highly conducive for applications requiring low back pressures. Examples of such applications include diesel particulate filters and catalyzed diesel particulate filters. For such applications the properties are tailored to include a porosity in the range of 40 to 55% (as measured by mercury porosimetry), a median pore size of 5 to 20 micrometers, and a CTE (RT-1000° C.) of less than $15 \times 10^{-7}$ $°C.^{-1}$.

A diesel particulate filter is typically a wall-flow filter with an end-plugged honeycomb body. Honeycomb substrates are also useful in automotive catalytic converter applications. Characteristically a honeycomb structure includes opposing inlet and outlet ends, and a multiplicity of cells extending from the inlet end to the outlet end, the cells having porous walls. For a wall-flow filter, part of the total number of cells at the inlet end are plugged along a portion of their lengths, and the remaining part of cells that are open at the inlet end are plugged at the outlet end along a portion of their lengths.

This plugging configuration allows for engine exhaust stream passing through the cells of the honeycomb from the inlet end to the outlet end to flow into the open cells, through the cell walls, and out of the structure through the open cells at the outlet end. Suitable cellular densities for diesel particulate filters range from 70 cells/in² (10.9 cells/cm²) to 800 cells/in² (124 cells/cm²).

A honeycomb structure is formed by extruding a plasticized batch of ceramic materials through a honeycomb die. In the process of the present invention, a batch is prepared from certain inorganic raw materials which are batched to form the crystal phase(s). Depending on the phases present, the raw materials may include sources of silica, alumina, titania and the like.

As discussed herein above, the inventive ceramic bodies include a glass phase. The formation of this phase may be accomplished by forming the desired glass by well known forming methods, crushing to obtain a powder, and then dry blending with the inorganic raw materials in preparation of the batch. Alternatively, glass-forming raw materials are batched together with the crystal-phase forming raw materials to form the glass during the subsequent step of sintering.

The inorganic raw materials are further blended together with organic processing aids that may include plasticizers, lubricants, binders and water as a solvent. A homogenous and plasticized mixture is formed and then shaped into a green body, such as the honeycomb structure discussed above, typically by well known methods, such as extrusion.

It may be necessary to include a pore former with the raw materials to tailor the porosity and median pore size for diesel particulate filter applications. Graphite or polyethylene beads are suitable for this purpose. The pore former is a fugitive material that evaporates or undergoes vaporization by combustion during drying or heating of the green body to usually obtain higher porosity and/or coarser median pore diameter.

Suitable inorganic raw materials in the present invention are those that form the necessary crystal phases. For the aluminum titanate phase alumina and titania are required. Suitable aluminas include pure aluminum oxide, alpha-alumina, a transition alumina such as gamma-alumina or rho-alumina, hydrated alumina, gibbsite, boehmite, aluminum hydroxide, and mixtures thereof. Typically the particle size of the alumina material may be up to 25 micrometers. A titania source is rutile, although other sources may be equally suitable. The median particle size of the titania raw material is no greater than 20 micrometers to avoid entrapment of unreacted oxides by the rapidly growing nuclei in the structure.

The inventive ceramic body may include other crystal phases. In one embodiment a secondary phase of up to 40% by weight mullite is included in addition to the primary phase of aluminum titanate. Mullite is an aluminosilicate with a stoichiometry represented by the formula $3Al_2O_3 \cdot 2SiO_2$. Accordingly, silica must be used in the batch of raw materials. Suitable silica sources include quartz, cristobalite, kaolin, non-crystalline silica such as fused silica or sol-gel silica, silicone resin, zeolite and diatomaceous silica. The silica typically has a particle size of up to 30 micrometers. Other inorganic raw materials may be used depending on the crystal phase desired in the final product structure.

The inorganic raw materials are mixed with organic processing aids, such as methylcellulose binder, and oleic acid/triethanol amine surfactant, to form a plasticized and homogenous mixture. The so-formed mixture is shaped into green (unfired) bodies usually by any conventional means, but typically forced through an extrusion die to form a honeycomb structure.

The resulting green bodies are optionally dried, and then heated over various temperature intervals with temperatures between 1350–1650° C., and hold times of 6–10 hours at top temperature for sintering. After firing, honeycomb structures used for diesel particulate filtering applications are end plugged, such that each cell of the structure is plugged at either the inlet or outlet ends, but not both. Typically every other cell on a given end plugged in a checkered pattern.

To more fully illustrate the invention, the following non-limiting examples are presented.

EXAMPLES

Table I provides the parts and proportions for samples 1–7. Samples 1–6 have a glass phase (Glass X), the composition of which is provided in Table II. The glass is melted at 1600° C. according to known techniques and then ground to a powder (–325 mesh).

The dry ingredients including the inorganic raw materials, powdered glass and methylcellulose binder are dry mixed in a muller. The oleic acid and about 20 wt. % water are then slowly added during continuous mixing to provide homogenization and plasticization.

The plasticized mixture is extruded through a honeycomb die to form honeycomb bodies having approximately 200 cells/in² and a wall thickness of about 0.016 inch. The bodies thus formed are cut to desired lengths, and heated in an oven at 85° C. until dry. The samples are then fired in an electric furnace over various temperature intervals ranging from 1350–1650° C. with a hold time of 6–10 hours, and cooled by shutting off power to the furnace.

The samples are then tested for thermal cycling growth and thermal decomposition. The thermal cycling experiments are performed in air by infrared heating and forced-air cooling between 200–1100° C. with a total cycle time of 10 minutes. The decomposition experiments are carried out in air by heating in an electric resistance-heated furnace at the specified temperature and time.

Figure 3:
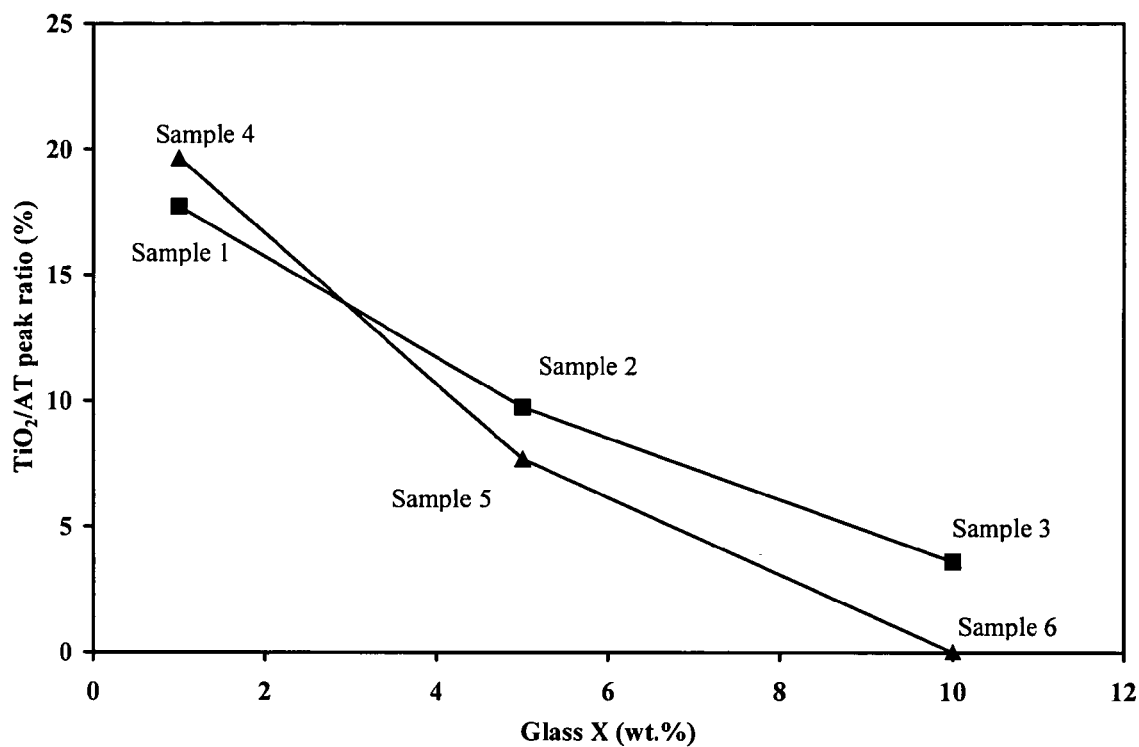
FIG. 3 shows the X-ray diffraction peak ratio of titania ($TiO_2$) (d-spacing of 3.25) to aluminum titanate ($Al_2O_3$—$TiO_2$) (average of d-spacings 4.70, 3.35, 2.65, and 1.90) as a function of weight percent of Glass X, for samples 1–6 after heating them to 1550° C. with a hold at that temperature of 8 hours.

FIG. 3 shows the X-ray diffraction peak ratio of titania ($TiO_2$) (d-spacing of 3.25) to aluminum titanate ($Al_2O_3$—$TiO_2$) (average of d-spacings 4.70, 3.35, 2.65, and 1.90) for samples 1–6 after heating to 1550° C. for 8 hours. As the amount of glass increases, the amount of unreacted titania decreases for the same firing temperature. Therefore, the reactions are more fully complete for higher glass content which allows shorter firing times and/or lower firing temperatures.

Figure 4:
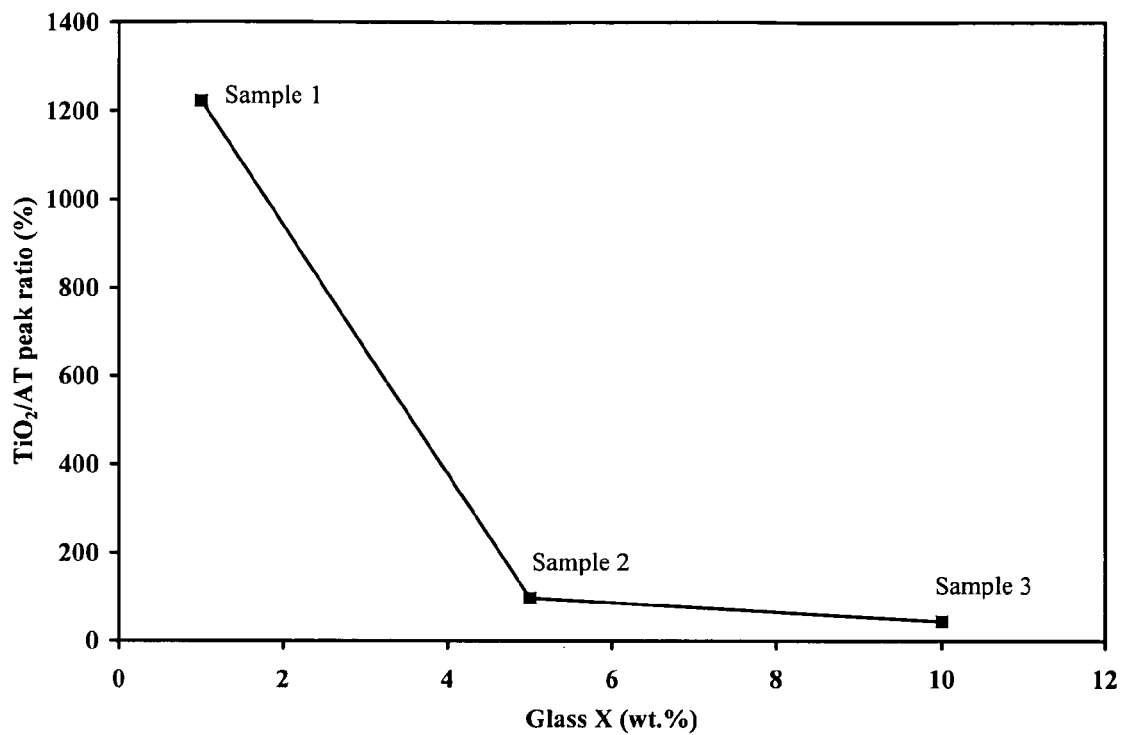
FIG. 4 shows the X-ray diffraction peak ratio of titania ($TiO_2$) (d-spacing of 3.25) to aluminum titanate ($Al_2O_3$—$TiO_2$) (average of d-spacings 4.70, 3.35, 2.65, and 1.90) as a function of weight percent of Glass X, for samples 1–3 after heating them to 1100° C. with a hold at that temperature of 100 hours; and, FIG. 5 shows the thermal cycling growth as a function of cycles of heating between 200–1100° C. in a time of 10 minutes and cooling between 1100–200° C. in the same time period for samples 4–6 which all include a glass phase, and sample 7 which does not.

FIG. 4 shows the X-ray diffraction peak ratio of titania ($TiO_2$) (d-spacing of 3.25) to aluminum titanate ($Al_2O_3$—$TiO_2$) (average of d-spacings 4.70, 3.35, 2.65, and 1.90) for samples 1–3 after heating to 1100° C. for 100 hours. Almost the entire amount of aluminum titanate in example 1 is decomposed into alumina and titania. On the contrary samples 2 and 3 with 5 wt. % and 10 wt. % glass, respectively have less aluminum titanate decomposition after the same treatment, with the least decomposition occurring in sample 3 containing the highest amount of glass. At least 5 wt. % glass is required for optimum thermal decomposition resistance. Amounts of glass higher than 50% are not recommended in order to retain the beneficial properties of aluminum titanate.

Figure 5:
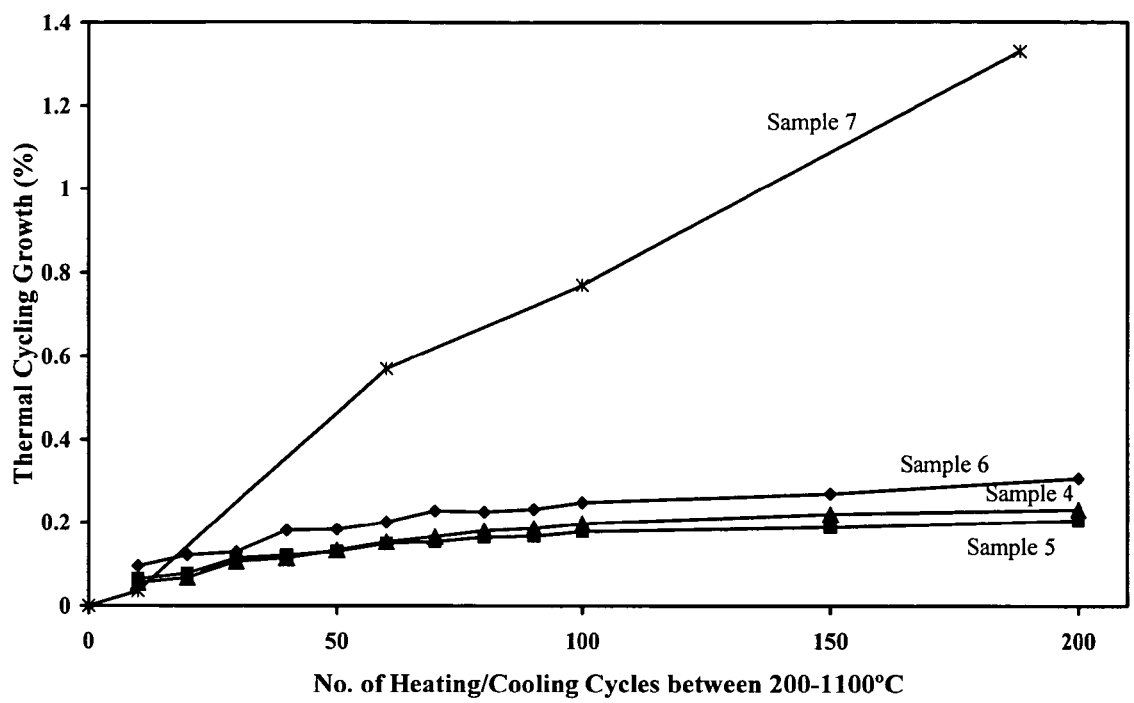

FIG. 5 shows the thermal cycling growth as a function of cycles of heating between 200–1100° C. in a time of 10 minutes, and then cooling from 1100–200° C. in the same time for samples 4–6 and sample 7. Samples 4–6 contain a primary crystal phase of 70 wt. % aluminum titanate and a secondary crystal phase of 30 wt. % mullite, and a glass phase in an amount of 1 wt. %, 5 wt. %, and 10 wt. % respectively. Sample 7 contains 67 wt. % aluminum titanate, 30 wt. % mullite and 3 wt. % $FeTiO_5$, but no glass phase. As is shown, sample 7 undergoes the most dimensional growth, whereas the glass phases in samples 4–6 suppress thermal cycling growth.

Table III provides the parts and proportions for sample 8 which is prepared to include 5 wt. % Glass Y whose composition is provided in Table IV. The same forming process as provided above for samples 1–7 is used in preparation of sample 8. Firing for sample 8 is conducted at 1200° C. for 4 hours and 1500° C. for 6 hours.

Table III also includes the properties which were measured on sample 8. These include modulus of rupture in pounds per square inch (psi) as measured on a cellular bar cut parallel to the direction of the channels from a honeycomb body having a cell density of 200 cells/in² and 0.016 inch thick walls, porosity in % volume as measured by mercury porosimetry, median pore size in micrometers as measured by mercury porosimetry, and thermal expansion in $10^{-7}/°$ C. as measured by dilatometry.

Figure 2:
FIG. 2 is a scanning electron microscope (SEM) photomicrograph showing the representative microstructure of an inventive body (sample 8) having 95 wt. % aluminum titanate and 5 wt. % glass (glass Y)

FIG. 2 which is described briefly above, is a SEM photomicrograph of sample 8. As shown the microstructure includes a well connected porosity with a uniform pore distribution, a combination which offers a significant pressure drop advantage when utilized in automotive exhaust filtration. In thermal decomposition tests, the composition of sample 8 met the low CTE and low thermal cycling growth required for diesel filtration applications. In thermal cycling tests including 300 cycles of heating between 200–1000° C. in a time of 10 minutes, and then cooling from 1000–200° C. in the same time, the thermal cycling growth of sample 8 is less than 0.25%. Additional, no CTE change, and no significant loss of strength (3.6%) are observed after thermal cycling in sample 8.

It should be understood that while the present invention has been described in detail with respect to certain illustrative and specific embodiments thereof, it should not be considered limited to such but may be used in other ways without departing from the spirit of the invention and scope of the appended claims.

TABLE I

Composition, batch components and processing conditions for samples 1–7.

| | Samples | | | | | | |
|---|---|---|---|---|---|---|---|
| | 1 | 2 | 3 | 4 | 5 | 6 | 7 |
| Composition (wt. %) | | | | | | | |
| Aluminum Titanate | 99 | 95 | 90 | 70 | 70 | 70 | 67 |
| Mullite | — | — | — | 30 | 30 | 30 | 30 |
| $Fe_2O_5$ | — | — | — | — | — | — | 3 |
| Glass | 1 | 5 | 10 | 1 | 5 | 10 | — |
| Inorganic Batch Materials (wt. %) | | | | | | | |
| $Al_2O_3$ RMA-35 ® (Alcan) | 55.69 | 54.19 | 52.31 | 60.42 | 58.72 | 56.60 | 59.22 |
| $TiO_2$ Titanox3020 ® (Kronos) | 43.51 | 41.83 | 39.73 | 30.46 | 29.31 | 27.87 | 30.55 |
| $SiO_2$ Silverbond200 ® (Unimin Corp.) | 0.73 | 3.64 | 7.28 | 9.05 | 11.63 | 14.85 | 8.41 |
| $Na_2CO_3$ | 0.019 | 0.096 | 0.193 | 0.019 | 0.096 | 0.193 | — |
| $CaCO_3$ | 0.035 | 0.173 | 0.346 | 0.035 | 0.173 | 0.346 | — |
| $K_2CO_3$ | 0.014 | 0.071 | 0.142 | 0.014 | 0.071 | 0.142 | — |
| $Fe_2O_3$ Hematite (Fisher Scientific) | — | — | — | — | — | — | 1.83 |
| Organic Batch Additives and Solvent (wt. % supperaddition) | | | | | | | |
| A4M Methocel ® (Dow Chemical) | 6 | 6 | 6 | 6 | 6 | 6 | 6 |
| Oleic Acid | 2 | 2 | 2 | 2 | 2 | 2 | 2 |

TABLE II

Composition for Glass X.

| Glass Components | % by Weight |
|---|---|
| $SiO_2$ | 74.87 |
| $Al_2O_3$ | 18.97 |
| $TiO_2$ | 2.00 |
| $Na_2O$ | 1.16 |
| CaO | 1.99 |
| $K_2O$ | 1.00 |

TABLE III

Composition, batch components, processing conditions and properties for sample 8.

| | Sample 8 |
|---|---|
| Composition (wt. %) | |
| Aluminum Titanate | 95 |
| Glass Phase | 5 |
| Inorganic Batch Materials (wt. %) | |
| $Al_2O_3$ RMA-35 ® (Alcan) | 53.3 |
| $TiO_2$ Titanox3020 ® (Kronos) | 41.7 |
| Glass Y | 5 |
| Organic Batch Additives and Solvent (wt. % supperaddition) | |
| A4M Methocel ® (Dow Chemical) | 4.5 |
| Oleic Acid | 1.0 |
| TEA (tri-ethanol amine) | 0.15 |
| Water | ~20 |
| Processing Conditions | |
| Firing Temp. (° C.) | 1200/1500 |
| Hold Time (hours) | 4/6 |
| Properties | |
| CTE ($10-7/°$ C.) | 8.95 |
| Porosity (% Volume) | 39.5 |
| Median Pore Size (mm) | 9 |
| MOR-rod (psi) | 521.5 |

TABLE IV

Composition for Glass Y.

| Glass Components | % by Weight |
|---|---|
| $SiO_2$ | 62.01 |
| $Al_2O_3$ | 17.54 |
| $Na_2O$ | 10.94 |
| $K_2O$ | 9.51 |

What is claimed:

1. A ceramic body comprising a crystal phase of aluminum titanate in an amount of 50 to 95% by weight, and a glass phase in an amount of 5 to 50% by weight, the glass being an aluminosilicate and having a composition consisting essentially, in weight percent on an oxide basis, of 50–90 $SiO_2$, 1–25 $Al_2O_3$, 0.5–10 $TiO_2$, 0.5–20 $R_2O$, where R is selected from the group consisting of Li, Na, K, Ru, Cs, Fr, and 0.5–20 R'O, where R' is selected from the group consisting of Be, Mg, Ca, Ba, Ra, wherein the ceramic body includes not more than 2% by weight $Fe_2O_3$.

2. A ceramic body according to claim 1 optionally including a second crystal phase of mullite in an amount of up to 40% by weight.

3. A ceramic body according to claim 1 wherein the aluminosilicate glass has a composition consisting essentially of 70–80 $SiO_2$, 15–22 $Al_2O_3$, 1–3 $TiO_2$, 0.5–5 $Na_2O$, 0.5–5 CaO, 0.5–5 $K_2O$.

4. A ceramic body according to claim 1 wherein the aluminosilicate glass has a composition consisting essentially of 50–70 $SiO_2$, 10–20 $Al_2O_3$, 5–20 $Na_2O$, 5–20 $K_2O$.

5. A ceramic body according to claim 1 having a high resistance to thermal decomposition as characterized by a titania ($TiO_2$) (d-spacing of 3.25) to aluminum titanate ($Al_2O_3$—$TiO_2$) (average of d-spacings 4.70, 3.35, 2.65, and 1.90) peak ratio of less than 100% after heating to 1100° C. for 100 hours.

6. A ceramic body according to claim 1 having a low thermal cycling growth as characterized by a linear dimensional growth of less than 0.5% after the ceramic body undergoes at least 200 cycles of heating between 200° C. to 1100° C. in a time of 10 minutes, and cooling between 1100° C. to 200° C. in a time of 10 minutes.

7. A ceramic body according to claim 1 having a coefficient of thermal expansion (RT-1000° C.) of less than $20 \times 10^{-7}$ °$C.^{-1}$.

8. A diesel particulate filter comprising the ceramic body of claim 1 and having a wall-flow honeycomb filter body including a plurality of parallel end-plugged cell channels traversing the body from a frontal inlet end to an outlet end thereof.

9. A diesel particulate filter according to claim 8 exhibiting a coefficient of thermal expansion (RT-1000° C.) of less than $15 \times 10^{-7}$ °$C.^{-1}$, a porosity of 40% to 55% by volume, and a median pore size of 5 to 20 micrometers.

10. A method of making an aluminum titanate-based ceramic body comprising:
 a. formulating a batch of raw materials including sources of silica, alumina, titania, alkali metals, alkaline earth metals, and optionally a pore former;
 b. mixing the batch with organic processing aids including lubricants, binders, plasticizers, and the like, and water as solvent to form a homogeneous and plasticized mixture;
 c. shaping the homogeneous and plasticized mixture into a green body;
 d. optionally drying the green body, and then heating to a temperature and for a period of time to develop a body having a crystal phase of aluminum titanate in an amount of 50 to 95% by weight, which optionally includes up to 40% by weight mullite as a second crystal phase, and a glass phase in an amount of 5 to 50% by weight, the glass being an aluminosilicate and having a composition consisting essentially, in weight percent on an oxide basis, of 50–90 $SiO_2$, 1–25 $Al_2O_3$, 0.5–10 $TiO_2$, 0.5–20 $R_2O$, where R is selected from the group consisting of Li, Na, K, Ru, Cs, Fr, and 0.5–20 R'O, where R' is selected from the group consisting of Be, Mg, Ca, Ba, Ra, wherein the ceramic body includes not more than 2% by weight $Fe_2O_3$.

11. A method according to claim 10 wherein the green body is a honeycomb structure.

12. A diesel particulate filter comprising the ceramic body of claim 8 wherein the ceramic body includes a second crystal phase of mullite in an amount of up to 40% by weight.

* * * * *